United States Patent
Bowis et al.

(10) Patent No.: US 11,989,534 B2
(45) Date of Patent: May 21, 2024

(54) METHOD AND CONTROL SYSTEM FOR ACTIVATING MULTIPLE VEHICLE APPLICATIONS

(71) Applicant: Nott Company, Arden Hills, MN (US)

(72) Inventors: John Kahler Bowis, Saint Louis Park, MN (US); Dusten Carl O'Konek, Jr., Henderson, MN (US)

(73) Assignee: Nott Company, Arden Hills, MN (US)

( * ) Notice: Subject to any disclaimer, the term of this patent is extended or adjusted under 35 U.S.C. 154(b) by 50 days.

(21) Appl. No.: 17/940,683

(22) Filed: Sep. 8, 2022

(65) Prior Publication Data

US 2023/0127886 A1    Apr. 27, 2023

Related U.S. Application Data

(60) Provisional application No. 63/250,226, filed on Sep. 30, 2021.

(51) Int. Cl.
G06F 8/30    (2018.01)

(52) U.S. Cl.
CPC .................................. *G06F 8/311* (2013.01)

(58) Field of Classification Search
CPC ........................................................ G06F 8/30
See application file for complete search history.

(56) References Cited

U.S. PATENT DOCUMENTS

| | | | |
|---|---|---|---|
| 6,895,578 B1 * | 5/2005 | Kolawa | G06F 11/3624 717/130 |
| 2004/0010632 A1 * | 1/2004 | Kiick | G06F 8/656 710/1 |
| 2016/0266729 A1 * | 9/2016 | Sun | H04M 1/725 |
| 2020/0097586 A1 * | 3/2020 | Balik | G06F 40/103 |

* cited by examiner

*Primary Examiner* — Jae U Jeon
(74) *Attorney, Agent, or Firm* — Ballard Spahr LLP

(57) ABSTRACT

The disclosure relates to a computer program product and a method of using the same computer program product to add, compartmentalize and integrate a segment of code assigning to a previously absent function to be selectable across wider platform of main code. The disclosure also relates to methods of selecting and activating functions of a vehicle, such as a modular truck.

17 Claims, 7 Drawing Sheets

METHOD AND CONTROL SYSTEM FOR ACTIVATING MULTIPLE VEHICLE APPLICATIONS

CROSS-REFERENCE TO RELATED APPLICATION

This application claims priority to, and the benefit of the filing date of, U.S. provisional Patent Application No. 63/250,226, filed Sep. 30, 2021, the entirety of which is hereby incorporated by reference herein.

BACKGROUND

Typically, developers of vehicle software build and maintain a unique program for each type of device in the field. If a user has a new application with significant overlap but several substantially different needs than all existing applications, the supplier of the controller must develop and maintain a new program. This can be costly, because if the developer chooses to change the overlapping code, they have to make parallel changes in multiple programs, which increases development time and creates chances for mistakes that cause malfunctions.

Currently, a developer in this industry who wishes to have different applications use the same program may attempt to contain the second application's settings in the original program such that each setting is specifically programmed to be adjustable for each unit, and may write compartmentalized code to store the new application's functions, which can be collectively enabled or disabled under certain conditions.

There are limitations with both settings and compartmentalized code with current technology. Settings typically do not change the structure of the code itself (unless they are enabling or disabling a compartment of code). Instead, settings of software simply change values in the various calculations the code is making to produce different outcomes. Compartmentalized code can completely enable or disable certain features, which allows for more robust changes, but doing so can complicate the overlapping code and make it cumbersome to change.

SUMMARY OF EMBODIMENTS

The disclosure relates to a technique disclosed here is designed to allow developers to not only compartmentalize code to be activated and deactivated as needed, but to dramatically reduce the segments of overlapping code that must be modified when an additional application or setting is added. By having a single switch statement trigger the connections among the overlapping (or "cross-application") code and the application-specific code, new applications and variables are agnostic to each other, and existing cross-application code does not need to be constantly rewritten to accommodate another branch in its logical structure. The result is that maintaining a single program which has cross-application code as well as application-specific code is more viable for more complex programs, applied to more applications, containing more settings, than the current level of industry technology allows.

In the industry of on-highway maintenance vehicles and off-highway/construction equipment, it is common practice to have a single master controller (sometimes supplemented with slave controllers) housed on each machine, which receives inputs from sensors and the user interface, processes them, and controls outputs on the physical system and user interface.

Typically, the industry builds and maintains a unique program for each type of device in the field. If a user has a new application with lots of overlap but several substantially different needs, the supplier of the controller must develop and maintain a new program. This can be costly, because if the developer chooses to change the overlapping code, they have to make parallel changes in multiple programs, which increases development time and creates chances for mistakes that cause malfunctions.

Currently, a developer in this industry who wishes to have different applications use the same program, in order to avoid this problem, may attempt to contain the second application's functions in the original program in the form of which are often specifically programmed to be adjustable for each unit, and compartmentalized code, which can be collectively enabled or disabled under certain conditions.

There are limitations with both settings and compartmentalized code with current technology. Settings typically don't change the structure of the code itself (unless they are enabling or disabling a compartment of code), they simply change values in the various calculations the code is making to produce different outcomes. Compartmentalized code can completely enable or disable certain features, which allows for more robust changes, but doing so can complicate the cross-application code and make it cumbersome to change.

With current technology, each time a new application is created, or a new setting is created which requires different behavior depending on which application is enabled, the logical structure of the program has to change at many different points to accommodate the new condition. The number of points in the code that must be modified is increased with:
1. The complexity of the program
2. The number of applications the program is being applied to
3. The number of adjustable settings that behave differently for different applications
4. The number of internal settings that behave differently for different applications.

Crucially, this means that programs can become very difficult to change once they become complex, or if they have too many applications or settings which behave differently for different applications. Worse, if the applications and settings require different behavior in different combinations, the difficulty rises exponentially, rather than linearly, as the number of each changes. Each segment of code that must be modified when a new application is developed, or even when a new setting is developed, increases the amount of time that the developer must spend to execute the change, which likewise increases the likelihood that a segment of code is overlooked, leading to malfunction. Maintaining such a cumbersome single program can become comparably costly to maintaining multiple different programs.

The technique being invented here is designed to allow developers to not only compartmentalize code to be activated and deactivated as needed, but to dramatically reduce the segments of code that must be modified when an additional application or setting is added. By having a single switch statement trigger the connections among the components, new applications and variables are agnostic to each other, and existing cross-application code does not need to be constantly rewritten to accommodate another branch in its logical structure. The result is that maintaining a single program which has cross-application code as well as application-specific code is more viable for more complex programs, applied to more applications, containing more settings, than the current level of industry technology allows.

The disclosure relates to a computer-implemented method of adding to or executing a compartment function within a cross-application code in a non-transitory computer program product within a controller, such computer program product comprising the cross-application code, a switch statement, and a first compartment code; the method comprising: (i) adding a second compartment code associated with second application-specific function to the non-transitory computer program product; (ii) adding an additional case to the switch statement; (iii) executing the second application-specific function by activating the new case of the switch statement; wherein the step of executing the second application-specific function is free of a step of activating an interface between the first compartment code and the cross-application code. In some embodiments, the second compartment code is enabled (i.e. cross-application and application-specific events within the computer program are made to trigger the second application-specific function) via a single command. In some embodiments, this computer-implemented method of comprises a first application code, wherein the first application code comprises at least one virtual object corresponding to a first application and the second application code comprises at least one virtual object corresponding to a second application. In some embodiments, the first application code comprises at least one virtual object and one component corresponding to a first application and the second application code comprises at least one virtual object and one component corresponding to a second application. In some embodiments, the first application-specific function is a vehicle accessory function and the computer program product is a component on a controller in a vehicle accessible by electronic communication to the circuit operably attached to a switch, button, keypad or other selection element in the cab. In some embodiments, an operator in the cab of a vehicle comprising the controller and a panel housed in the cab can depress a switch, button, keypad or other selection element in the cab, which is operably connected to a circuit electrically connecting the computer program product accessible by the circuit. In some embodiments, the first application-specific function is a construction vehicle accessory function.

The disclosure also relates to any of the disclosed methods herein, wherein step (iii) identified in the aforementioned paragraph further comprises executing the first application-specific function with the activation of the switch command derived from the second compartment. In some embodiments, step (iii) further comprises executing the first application-specific function with the activation of the switch command derived from the second compartment by establishing one or a plurality of interfaces between the first and second virtual objects. In some embodiments, before step (i), the cross-application code and the first component code establish one or a plurality of interfaces for activation of a first application-specific function.

The disclosure relates to a non-transitory computer program product encoded on a computer-readable storage medium comprising instructions, in a system comprising a cross-application code and one or a plurality of compartments, each compartment comprising a virtual object and an application-specific function code associated with at least a first application-specific command, for: (i) receiving an additional compartment code associated with a second application-specific function, wherein the second compartment code may be enabled (i.e. cross-application and application-specific events within the computer program are made to trigger the second application-specific function) via a single command; (ii) executing the second application-specific function by issuing the enabling command; wherein the step of executing the second application-specific function is free of a step of activating an interface between the first compartment code and the cross-application code. In some embodiments, the non-transitory computer program product or products disclosed herein further comprise a step of adding an additional case to the switch statement after step (i) and before step (ii). In some embodiments, the non-transitory computer program product of any of the disclosed products disclosed herein comprises a first-application specific code, wherein the first application-specific code comprises at least one virtual object corresponding to a first application and the additional application code comprises at least one virtual object corresponding to a second application. In some embodiments, the first application code comprises at least one virtual object and one component corresponding to a first application and the additional application code comprises at least one virtual object and one component corresponding to an additional application. In some embodiments, the non-transitory computer program product comprises a first application-specific function is a vehicle accessory function. In some embodiments, the non-transitory computer program product comprises a first application-specific function is a construction vehicle accessory function. In some embodiments, the non-transitory computer program product of the disclosure comprises the aforementioned step (ii) and step (ii) further comprises executing the first application-specific function by activation of the command issued by the first case of the switch statement from the additional compartment. In some embodiments, step (ii) further comprises executing the first application-specific function with the activation of the new switch case by establishing one or a plurality of interfaces between the first and second virtual objects. In some embodiments, the computer program product comprises the aforementioned step (i), but before step (i), the cross-application code and the first component establish one or a plurality of interfaces for activation of a first and/or plurality of application-specific functions.

The disclosure also relates to a vehicle. The vehicle comprising a cab accessible to an operator, the operator capable of operating the vehicle from the cab. In some embodiments, the cab comprises a keypad, one or a plurality of switches or buttons operably connected to a circuit, the circuit operably connected to a controller via a wire or wireless communication adaptor. In some embodiments, the controller comprises any of the computer program products disclosed herein. In some embodiments, the disclosure relates to a vehicle comprising: (a) a first application; (b) a second application; (c) an electronic circuit in operable, electronic communication with the first and second applications, the circuit comprising a controller; and (d) a non-transitory computer program product disclosed herein encoded on any one or plurality of computer-readable storage medium in operable communication with the controller. In some embodiments, the computer program product comprises further comprising a display in operable communication with the controller.

In some embodiments, the disclosure relates to a vehicle comprising a display is capable of displaying one or more signals corresponding to one or more virtual objects from the one or plurality of compartments encoded within the non-transitory computer program product. In some embodiments, the vehicle is a truck or working vehicle. In some embodiments, the vehicle is free of a combustion engine. In some embodiments, the vehicle is a construction vehicle comprising at least a first and a second operable condition, wherein, in the first operable condition, the vehicle has at least a first application activated; and, in the second operable condition, the vehicle has at least the second or additional application activated. In some embodiments, in the second operable condition, the vehicle has both the first and second applications activated simultaneously. In some embodiments, the vehicle comprise a controller that comprises any one or plurality of computer program products disclosed herein, wherein the non-transitory computer program product is operably linked to an embedded processor.

The disclosure further relates to a computer-implemented method of activating an application on a system comprising a cross-application code and a first compartment code, the method comprising:
  a. appending a second compartment to the system, wherein the second compartment comprises a compartment-activating command independent of the cross-application code;
  b. establishing an interface between the first compartment and the second compartment by the compartment-activating command within the second compartment;
  c. executing the second application-specific function by activating the new switch case and the second compartment code;
    wherein step (b) is free of creating an interface between the second compartment and the cross-application code.

In some embodiments, the first compartment code comprises at least one virtual object corresponding to a first application and the second application compartment comprises at least one virtual object corresponding to a second application. In some embodiments, the first application compartment comprises at least one virtual object and one component corresponding to a first application and the second application compartment comprises at least one virtual object and one component corresponding to a second application.

The disclosure also relates to a method of selecting or activating a function (or application) of a vehicle, the method comprising establishing an interface between a first and second compartment code which is comprised within a computer program product on a controller in operable communication with a panel in the vehicle, wherein the first compartment code corresponds to a first working function or application of the vehicle and the second compartment code corresponds to a second working function or application of the vehicle; and wherein the method is free of a step of activating the a cross-application code. In some embodiments, the application is activation or extension of an actuator or similar device capable of opening, closing or extending an element on the vehicle.

DETAILED DESCRIPTION

Figure 1:
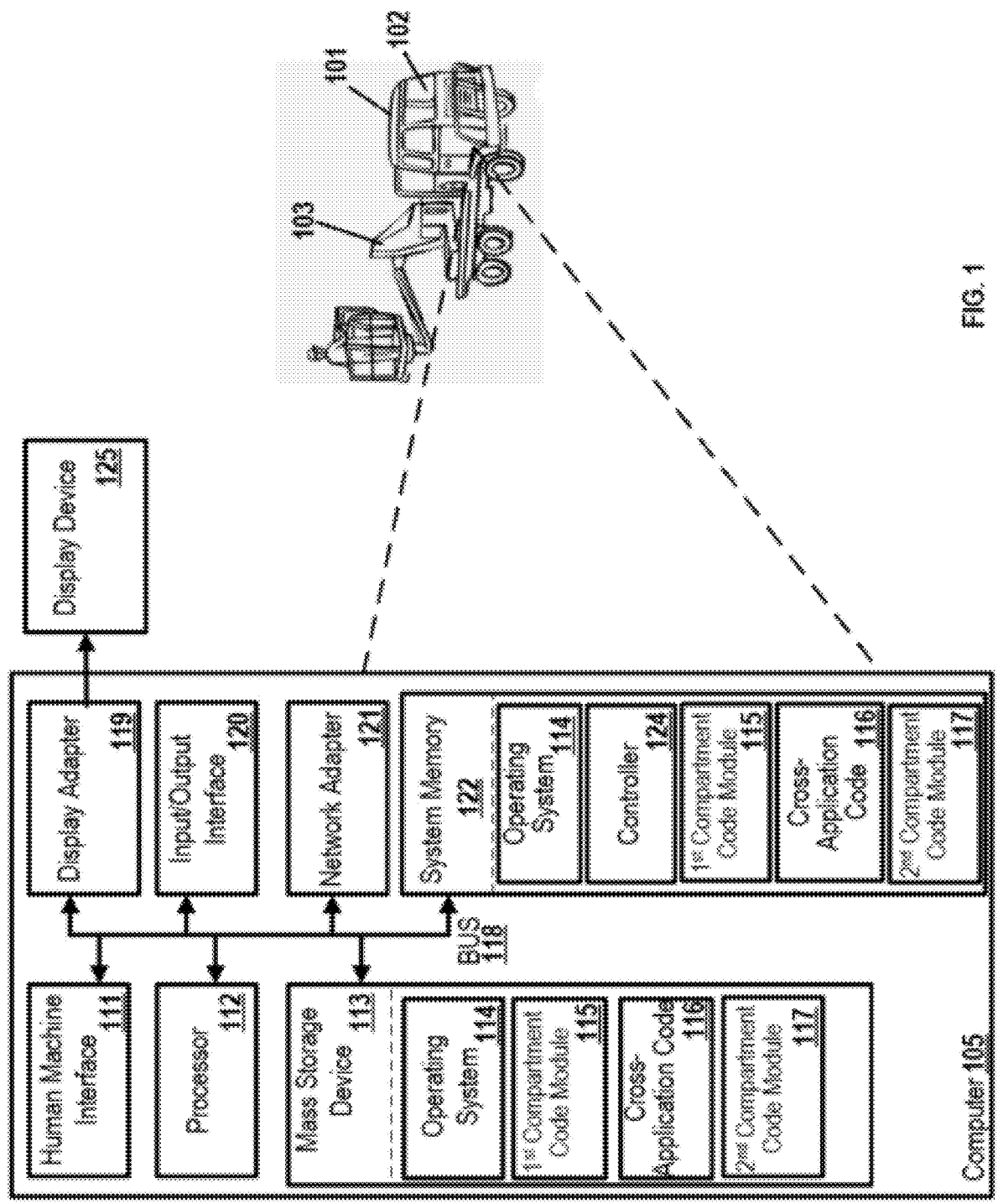
FIG. 1 is an example system for establishing cross talk between two components of executable software code according to the disclosure.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "vehicle" as used herein is defined as a machine that transports a user or material or performs one or a plurality of applications. In some embodiments, the vehicle is used to harvest agricultural material. In some embodiments, the vehicle is a windrower, a forage harvester, lawn mower or a combine including a baling mechanism. In some embodiments, the harvester is a self-propelled windrower. In some embodiments, the vehicle is a crane, construction vehicle or service vehicle.

The term "drive system" or "steering system" as used herein is defined as an assembly, hydraulic or mechanical arrangement that allows for control of the front and/or rear wheels of the harvester. In some embodiments, the disclosure relates to a vehicle comprising a drive system with a cab accessible to an operator of the vehicle.

The term "information" as used herein is defined as data values attributed to parameters. In some embodiments, information is digital and/or analog information. In some embodiments, information is the current operable mode of a vehicle. In some embodiments, information can be the current operable mode of an electronically powered, modular truck. In some embodiments, information comprises information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or vehicle. In some embodiments, the vehicle includes a software system with executable code that executes different hydraulic states or different applications based on operator choosing an operable mode of the vehicle. In some embodiments, the disclosure also relates to a computer software product with executable code that automatically toggles between or through different operable modes based on operator installing or appending or activating components of the code. The software program product may be on any medium or a component of a system optionally configured for update or install into the software of an existing harvester.

In some embodiments, the medium may be or may include an electronic, magnetic, optical, electromagnetic, Infrared (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the disclosure relates to a vehicle comprising the processing system that comprises a controller, operating system and computer program product all in operable electronic communication with each other through one or plurality of circuits connected via wires or wireless signal. In some embodiments, the memory is capable of storing preferred settings or information about activation of on or a plurality of applications on a vehicle. In some embodiments, the system includes one or a plurality of signals indicate activation or deactivation of applications selected by the operator. The signals may be propagated by a controller hard wired to one or more wires creating a physical connection to one or a plurality of controllers and/or active applications can be activated and used over a WiFi hotspot, Bluetooth® or other internet connection with controllers capable of receiving such remote signals. In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any application disclosed herein may function on any disclosed vehicle by integration of application-specific code into one or more data processing systems of the harvester. For example, in some embodiments, the disclosure relates to a data processing system including executable software program product configured for sending and receiving information about activating and/or utilizing multiple applications of the vehicle.

The disclosure relates to a non-transitory computer program product or a system comprising the same where the computer program product comprises executable steps to execute function of one component code by communication with another component code independent of interfacing between a cross-application and either of the first or second component codes. In software development, it is often challenging, and significantly costly, to maintain many concurrent versions of similar programs. If there is a group of machine applications, the programs of which share much of the same cross-application source code, but with some application-specific functions, classes, and display pages, it is desirable to find a way to keep as few distinct versions of the code as possible. In C++, like in many programming languages, it is possible to compartmentalize code into classes, and then to create specific instances of those classes at runtime. C++ supports object-oriented programming, which this strategy is built around.

As a non-limiting example, in C++, it is possible to create Signals, and Slots, and create Connections at runtime. A Signal is a trigger that is emitted by an instance of an object at some point during runtime, often passing one or several arguments. A Slot is a segment of code which can be called as a consequence of detecting an emitted Signal. A Connection is a line of code called at runtime which causes one object to listen for a particular Signal emitted by another object, and calls a particular Slot when a Signal of that type is emitted by the object being listened to. In C++, a connection is established by calling a function "connect( )" with the following arguments: a pointer to an object, the name of a signal within that object, a pointer to a second object, and the name of a slot within the second object. While the specific terms Signals, Slots, and Connections are particular to C++, analogous elements exist in other programming languages, which could be used to employ the strategy described in this document.

Signals, Slots, and the Connections which link them are an alternative to directly calling functions from other functions. Multiple objects can be made to listen for the same signal from a particular object without interfering with each other, and since connections are established at runtime, two physical devices running the same program can have different connections established, and therefore, can yield completely different behavior from the same user actions or environment stimulus.

This disclosure is directed to a method of compartmentalizing compartment code and establishing connections between two different segments of compartment code, which allows a single program to define objects for multiple types of applications, but only establishes connections among (and thus, unlocks the functionality of) objects which the particular unit is authorized to be using. In some embodiments, the authorization is a permission provided by a vehicle dealer to an operator of a vehicle comprising a controller that houses the disclosed computer program products. In the context of a vehicle comprising a system that operates such code, a dealer can offer the vehicle with multiple functions as determined by a dealer, while all other objects remain dormant. This will allow only one concurrent program to be maintained at a time by the developer, with individual units being individually restricted during runtime using a flag set by the dealer prior to delivery.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks. Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The disclosure relates to a computer program product comprising a cross-application and one or a plurality of compartment codes. The disclosure also relates to a method of instantiating the cross-application code before or simultaneously with performing a method of activating a first compartment code through an interface between the first compartment code and a second compartment code. The problem with neglecting to instantiate the unused application-specific objects whatsoever is that it requires operations in the cross-application code to anticipate those objects to be uninstantiated. Low-level connections between the front-end and the back-end of the program which form the basis of connections made elsewhere become much more cumbersome, laced with conditional if-statements, and only get more complex as more applications are built into the program, and those applications share some overlap.

Having all application-specific objects be created at runtime without exception, but remain unconnected, except in the case that the machineType flag is set to the appropriate index value, preserves a more simple design that is easier to continue to develop and maintain. Additionally, the memory costs of creating instances of the application-specific machine component classes are not expected to be too substantial on their own, even if many applications are developed for, compared to the overall memory capacity of the platforms being used. Memory costs of small numbers of individual objects are not substantial compared to the memory costs of graphics or of large lists of objects.

FIG. 1 shows an example system 100 for establishing cross talk between two components of executable software code in a vehicle. Although only certain devices and/or components are shown, the system 100 may comprise a variety of other devices and/or components that support a wide variety of functions, such as network and/or communication functions. Those skilled in the art will appreciate that the present systems and methods may be used in various types of networks and systems that employ both digital and analog equipment.

The system 100 may include a vehicle 101. The vehicle 101 may be any type of machine that transports a user or material or performs one or a plurality of applications. For example, the vehicle 101 may be any form of self-propelled vehicle, such as, but not limited to, a light or heavy duty truck, specialty truck, construction equipment, farming equipment, cleaning vehicle, and the like. Examples of the vehicle 101 may include, but are not limited to, a bucket lift truck, a garbage truck, a crane transport, a crop harvester, a street vacuum, a street sweeper, a moving truck, or a concrete mixing truck. The vehicle 101 may include and be propelled or driven by one or more of a combustion based drive system or an electrical drive system.

The vehicle 101 may include a non-driving mode feature, such as a working device 103. The working device 103 may be any device for conducting secondary work using the vehicle 101. Examples of the working device 103 may include, but are not limited to, a bucket lift, a compactor (e.g., a garbage compactor on a garbage truck), a crane, a crop harvester, a vacuum system, a street sweeping system, a lift, an elevator, or a mixer (e.g., a concrete mixer). The working device 103 may be coupled to or positioned along any portion of the vehicle 101. The working device 103 may be powered by either one of the combustion engine or an electrical motor system for the vehicle 101.

The vehicle 101 may also include a cab 102. The cab may house portions of the steering and driving mechanisms for the vehicle 101. The cab 102 may be configured to receive a one or more persons for driving and/or riding in the vehicle 101. The cab 102 may further include a display device 125 for receiving information about the vehicle 101 and initiating commands for actions to be taken by the vehicle. For example, the display device 125 may include or further act as a user interface for receiving user inputs.

The vehicle 101 may also include one or more computers 105. While the example of FIG. 1 shows a single computer 105, this is for example purposes only as multiple computers are contemplated herein. Furthermore, in embodiments that include multiple computers, any of the components or functions of the computer 105 shown herein may be included in one or more of the multiple computers to create a distributed computing system for the vehicle 101.

The computer 105 may support the operation of the vehicle 101 in a driving mode and/or in a non-driving mode. For example, the computer 105 may support operations of the vehicle 101 handled one set of compartment code for one set of operations for the vehicle 101 and for a second set of compartment code for a second set of operations for the vehicle 101. The computer 105 may be communicably coupled to any electrical and/or electronic components of the vehicle 101, including the working device 103. While the example of FIG. 1 shows the computer 105 as a part of the vehicle 101, in other examples, all or a portion of the elements of the computer 105 may be an add-on feature for the vehicle 101.

The computer 105 may comprise one or more processors or processing units 112, a system memory 122, and a system bus 118 that couples various system components of the computer 105, including the processor 112, to the system memory 122. In the case of multiple processing units 112, the system may utilize parallel computing.

The system bus 118 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB) and the like.

The bus 118 may also be implemented over a wired or wireless network connection to each of the subsystems, including the processor 112, a mass storage device 113, an operating system 114, first compartment code module 115, cross-application code 116, second compartment code module 117, a controller 124, a network adapter 121, an Input/Output (I/O) interface 120, a display adapter 119, a display device 125, and a human machine interface 111. It is understood that the bus 118 and each of the aforementioned subsystems may be contained within one or more separate computing devices at the vehicle 101, in effect implementing a fully distributed system.

The computer 105 may operate on and/or comprise a variety of computer-readable media (e.g., non-transitory computer-readable media). Computer-readable media may be any available media that is accessible by the computer 105 and comprises both volatile and non-volatile media and removable and non-removable media. The system memory 122 comprises computer-readable media in the form of volatile memory, such as random access memory (RAM), and/or non-volatile memory, such as read only memory (ROM). The system memory 122 typically contains data and/or program modules, such as the operating system 114, the controller 124, the first compartment code module 115, the cross-application code 116, and the second compartment code module 117, that are accessible to and/or are operated on by the one or more processors 112. While the example of FIG. 1 shows a first compartment code module 115 and a second compartment code module 117, this is for example purposes only. As described herein, the computing device 105 may include any number of compartment code modules and each may be associated with a particular compartment (or set of operations) for the vehicle 101.

The first compartment code module 115 may be configured to handle and/or control operations of a first portion of the vehicle 101. For example, the first compartment code module 115 may include the first compartment code. The second compartment code module 115 may be configured to handle and/or control operations of a second portion of the vehicle 101. For example, the second compartment code module may include the second compartment code. For example, the second compartment code may be associated with a modular add-on feature for the vehicle 101. For example, each of the first compartment code and the second compartment code may include application specific code and overlapping code.

The controller 124 may be configured to control one or more operations of the vehicle 101. For example, the controller 124 may be configured to receive inputs and determine which compartment codes may be associated with the requested input. For example, the controller 124 may be configured to control signaling or communications within the computing device, such as communications between the first compartment code module 115 and the second compartment control module 117.

The cross-application code 116 may code configured to allow the computer 105 to receive or process a command at one of the compartment code modules (e.g., the first compartment code module 115) and send or transfer the command to another compartment code module (e.g., the second compartment code module 117). For example, the cross-application code may act as interchange for code or commands to move from one compartment code module to another compartment code module.

The computer 105 may also comprise other removable/non-removable, volatile/non-volatile computer storage media. By way of example, the mass storage device 113 may provide non-volatile storage of computer code, computer-readable instructions, data structures, program modules, and other data for the computer 105. For example, the mass storage device 113 may be a hard disk, a removable magnetic disk, a removable optical disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 113, including by way of example, the operating system 114, the first compartment code module 115, the cross-application code 116, and the second compartment code module 117.

An operator of the vehicle 101, or another user may enter commands and information into the computer 105 via an input device (not shown). Examples of such input devices comprise, but are not limited to, a touchscreen, a keyboard, a pointing device (e.g., a "mouse"), a microphone, a joystick, a scanner, tactile input devices, such as gloves, and other body coverings, and the like. These and other input devices may be connected to the one or more processors 112 via a human machine interface 111 that is coupled to the system bus 118, but may be connected by other interface and bus structures, such as a parallel port, game port, an IEEE 1394 Port (also known as a Firewire port), a serial port, or a universal serial bus (USB).

The display device 125 may also be connected to the system bus 118 via an interface, such as the display adapter 119. In some embodiments, the display device 125 may include the input device (e.g., a touchscreen and/or buttons associated with a screen of the display device 125. It is contemplated that the computer 105 may have more than one display adapter 119 and the computer 105 may have more than one display device 125. For example, a display device may be a monitor, an LCD (Liquid Crystal Display), light emitting diode (LED) display, smart glass, or a projector. In addition to the display device 125, other output peripheral devices may comprise components, such as speakers (not shown) which may be connected to the computer 105 via the Input/Output Interface 120. The display device 125 and the computer 105 may be part of one device, or separate devices.

For purposes of illustration, application programs and other executable program components, such as the operating system 114 are illustrated herein as discrete blocks, although it is recognized that such programs and components reside at various times in different storage components of the computer 105, and are executed by the data processor(s) of the computer 105. An implementation of the first component module 115, the cross-application code 116, and/or the second compartment code module 117 may be stored on or transmitted across some form of computer-readable media. Any of the disclosed methods may be performed by computer-readable instructions embodied on computer-readable media.

Figure 2:
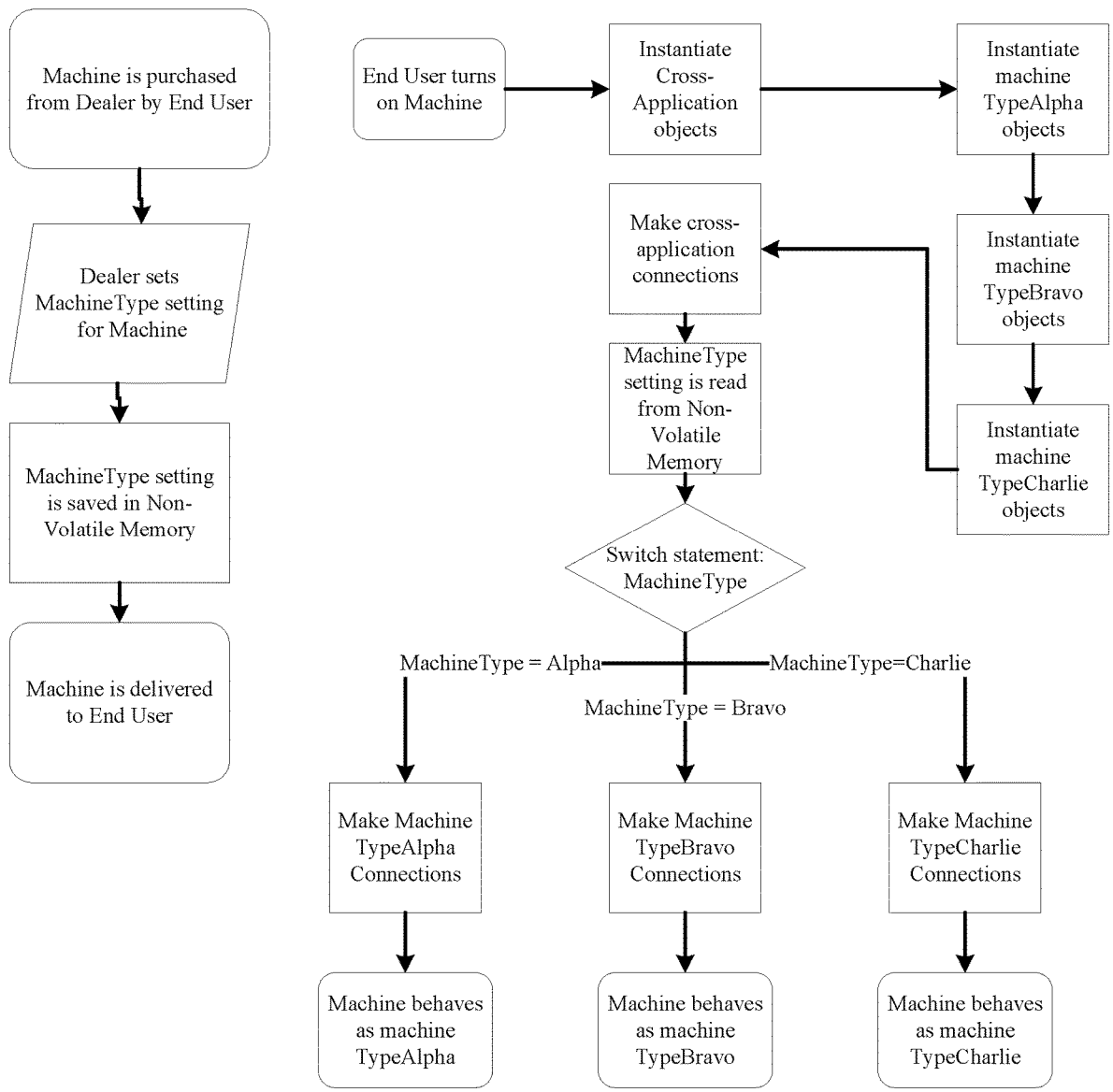
FIG. 2 is a flow chart of an example method for establishing cross talk between two components of executable software code according to the disclosure.

FIG. 2 discloses a flowchart that sets forth the steps in the process or method of storing and subsequently activating vehicle function, where vehicle functions are stored in a non-volatile memory within the controller 124 of a vehicle 101, such controller 124 operably connected to a panel (e.g., the display device 125) in a cab 102 accessible by an operator. The vehicle 101 may be purchased by an end user, which may or may not also be the operator of the vehicle 101. The seller of the vehicle 101 may set the machine type setting for the vehicle 101. For example, the machine type setting may determine which compartment code modules are to be included and/or activated for the vehicle 101. For example, the vehicle 101 may include all available compartment code modules, but only activate those that have been part of the purchase of the vehicle 101. The machine type setting may be saved in non-volatile memory of the computer 105. For example, the machine type setting may be saved in one or both of the mass storage device 113 and the system memory 122 of the computer 105. The vehicle 101 may be delivered or transferred to the end user.

Upon purchase of a vehicle 101, the computer program product stored in the memory comprises a cross-application code 116 that comprises Alpha, Bravo and Charlie object code, each assigned to one or a plurality of vehicle functions (i.e. compartment function associated with one of the compartment code modules). In some embodiments, the compartment function is activation, extension and opening of a boom or crane arm by fluid circuit operably connected to an actuator. In some embodiments, the function is opening and closing of a vehicle door or movement of an actuator to effect the same movement of a door or compressor. In some embodiments, the method comprises a step of instantiating object codes and establishing an interface between such object codes and a cross-application code, a step of activating a switch statement as between the object code or compartment code (e.g., first compartment code), such that the object code function or compartment function is activated through another compartment code (e.g., second compartment code) without activation of the cross-application code 116.

In some embodiments, the end user or another operator may turn on the vehicle 101. The vehicle 101 (e.g., the controller 124 of the computer 105) may instantiate cross-application objects. In addition, the computer 105 may instantiate Alpha object code, Bravo object code, and Charlie object code. Cross application connects are made. For example a command is received from an operator. For example, the command may be received via a user interface in the cab 102 of the vehicle 101 or from another portion of the vehicle 101. The command (or a signal representing the command) may be sent to one of the compartment code modules of the computer 105. For example, the command or signal may be sent to the compartment code module associated with the compartment code that controls the user interface.

The machine type setting may be read from non-volatile memory of the computer 105. For example, the controller 124 may determine the command being requested. The controller 124 may further determine, based on the command being requested, which compartment code module is associated with (e.g., controls) the operation of the portion of the vehicle associated with the command. For example, the controller 124 may determine that the command is for a bucket lift operation and the controller 124 may determine which compartment code module contains the compartment code for controlling the bucket lift operations. The controller 124 may further determine if the compartment code module that initially received the command is also the compartment code module that contains the compartment code for controlling the operations associated with the requested command.

Based on the controller 124 determining that the current compartment code module (e.g., that initially received the command) is not the compartment code module for controlling the operations associated with the requested command, the controller 124 may generate or cause the current compartment code module to generate a switch statement. The switch statement may cause the current compartment code module to send the command directly from the current compartment code module (e.g., the first compartment code module 115) to the compartment code module that contains the compartment code for controlling the operations associated with the requested command (e.g., the second compartment code module 117) without activating an interface between the current compartment code/code module (e.g., the first compartment code module 115) and the cross-application code 116. By using the switch statement to directly send the command from one compartment code module (e.g., the compartment code module associated with the Alpha operations and the Alpha object code) to a second compartment code module (e.g., one of the compartment code modules associated with the Bravo or Charlie operations and the Bravo or Charlie object code), the speed with which the computer operates is increased and may more efficient and the time it takes for the command to be initiated after being requested is reduced, because the additional step of activating an interface between the current compartment code/code module and the cross-application code 116 in order to transfer the command to the second compartment code module is skipped and made unnecessary. Once the command is received by the compartment code module associated with the operation requested in the command, the command can be initiated by at least a portion of the compartment code within that compartment code module.

Figure 3:
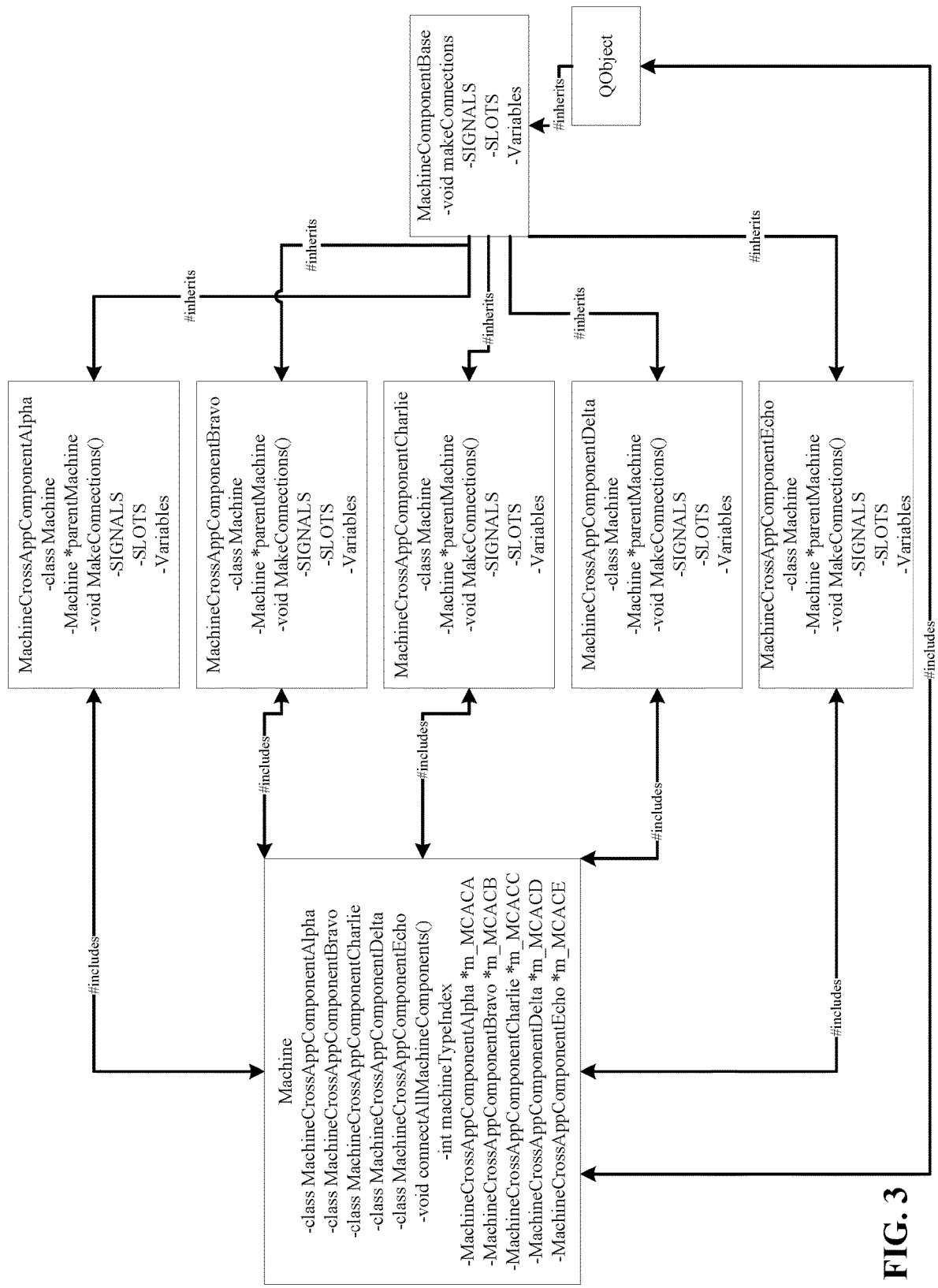
FIG. 3 is a flow chart depicting engineering steps to produce the desired software implemented functions according to the disclosure.

FIG. 3 depicts a method of enabling compartment code function using an interface between a first compartment code (e.g., in the first compartment code module 115) and a second compartment code (e.g., in the second compartment code module 117) without activation of cross-application MainType code 116.

EXAMPLES

Example 1: Structure Development Algorithm

A development algorithm for adding and initiating multiple tasks across multiple segments within the computer program product is described below. This development algorithm can be executed by multiple programming languages, so long as the language in question supports Object Oriented Programming, and permits established-at-runtime connections between "Signals" emitted by some objects and "Slots" held by other objects. This algorithm will be described as language-independently as possible, but where sample code may help explain the strategy, that sample code will be written with C++ syntax.

The algorithm in question comprises a cross-application code 116 (in the example below identified as MAIN), and multiple compartment segments of code (e.g., first compartment code module 115 and second compartment code module 117) that provide a vehicle 101 operating the computer program product three compartment code-specific functions, below identified as grouped within compartment codes: Alpha, Bravo and Delta groups. The algorithm in question comprises a parent object (in the example below identified as Machine), which contains each of the other objects. In the example below, there are multiple cross-application child objects contained within the parent object, identified as MachineCrossAppComponentAlpha, MachineCrossAppComponentBravo, and MachineCrossAppComponentCharlie. There are also multiple application-specific child objects contained within the parent object, identified below as MachineSpecAppComponentDelta and MachineSpecAppComponentEcho. The inheritance structure of Machine and the various CrossAppComponents and SpecAppComponents are described in FIG. 3.

In a method of executing a compartment code or initiating code within these groups or adding additional function, a first step comprises establishing an interface between the cross-application code 116 and the one or more segments of compartment code (e.g., the first compartment code module 115 and/or the second compartment code module 117) housing each group of functions. In the example below, the first step of adding code is making classes corresponding to machine function according to the following inheritance structure, which allows the pointers for the various machine component objects (a first compartment code) to be visible to the other machine component objects (a second compartment code):

In Main
   Create an instance of Machine
      m_machine=new Machine( );
   Set the value of the various Cross-App Machine Components within Machine to new instances of those classes
      m_machine.m_MCACA=new MachineCrossAppComponentAlpha( );
   Set the value of the various Spec-App (app-specific) Machine Components within Machine to new instances of those classes
      m_machine.m_MSACD=new MachineSpecAppComponentDelta( );
   Retrieve the machineTypeIndex from non-volatile memory
      m_machine.machineTypandex=[function which returns stored setting];
   Call connectAllMachineComponents
      m_machine.connectAllMachineComponents( );
In Machine::connectAllMachineComponents( )
   The function connectAllMachineComponents( ) first sets the value of the parentMachine pointer in each machine component to itself (the memory address pointing to m_machine in Main).
      m_MCACA→parentMachine=this;
      m_MCACB→parentMachine=this;
      . . .
   The function connectAllMachineComponents( ) then calls the makeConnections( ) function of each MachineCrossAppComponent,
      m_MCACA→makeConnections( );
      m_MCACB→makeConnections( );
      . . .

In some embodiments, the method disclosed herein comprises a step comprising instantiating the parent object in Main, and then instantiating in Main all of the cross-application child objects and all of the application-specific child objects. After instantiating the parent object and child objects, in some embodiments, the next step is to read the current machineTypeIndex from Non-Volatile Memory, and run a function to establish the connections specified in each of the child objects. In some embodiments, these connections between or among child objects are independent of activating the MachineCrossAppComponent.

In some embodiments, note that the vehicle 101 or methods or computer program product disclosed herein is free of instructions for a conditional statement calling makeConnections for the CrossAppComponent child objects. After adding a new case to the switch statement, the computer 105 can establish a connection between a first and second component code (e.g., between the first compartment code module 115 and the second compartment code module 117) based upon a trigger according to the code below that allows for electronic communication as between the first and second compartment codes.

Using the MachineTypeIndex which was read from Non-Volatile Memory, the program can use a single switch statement (or logical equivalent) to trigger makeConnections to be called for some AppSpecificComponent child objects, and not to be called for other objects. The function connectAllMachineComponents( ) finally performs a switch statement (or logical equivalent) on the machineTypeIndex, and calls the makeConnections( ) functions only of the MachineSpecAppComponents which correspond to the machineTypeIndex.

o  switch(machineTypeIndex){trigger for actuator on garbage truck door
   case: DeltaIndex: m_MSACD.makeConnections( );
     break;

```
case: EchoIndex: m_MSACE.makeConnections( );
    break;
...
}
```

Without interfacing the cross-application code 116, the first component code (e.g., code within the first compartment code module 115) and second compartment code (e.g., within the second compartment code module 117) can activate second compartment code function by execution of the switch statement trigger as indicated below. In this example, the switch statement comprises a trigger within Alpha or Bravo Groups that connect a function with Charlie. Each of the cross-application component child objects can connect with each other in their respective makeConnections functions. In this example, the makeConnections function for MachineCrossAppComponentAlpha connects signals being emitted from the Bravo and Charlie child objects to slots in the Alpha child object.

In MachineCrossAppComponentAlpha::makeConnections
  The function makeConnections( ) calls the makeConnections function it inherited from MachineComponentBase, allowing all components to make identical connections, if desired.
    MachineComponentBase::makeConnections( );
  The function makeConnections then establishes connections with other MachineComponents (using pointers to objects and the names of SIGNALS and SLOTS within those objects)
    (group of connections between vehicle data for specific function) connect(parentMachine→m_MCACB, SIGNAL(bravoSignalXChanged(int)), this, SLOT (processBravoSignalXChanged(int)));
    connect(parentMachine→m_MCACC, SIGNAL(charlieSignalYChanged(double)), this, SLOT(processCharlieSignalYChanged(double)));
Note that while establishing a connection is commonly done via a function within the object whose SLOT is being triggered, it is also possible for an object to make a connection between its own SIGNAL and another object's SLOT, or between the SIGNAL and SLOT of two completely independent objects, and without the interface or activation of the cross-application function 116.

The example algorithm comprises a parent object (in the example below identified as Machine), which contains each of the other objects. In the example below, there are multiple cross-application child objects contained within the parent object, identified as MachineCrossAppComponentAlpha, MachineCrossAppComponentBravo, and MachineCrossAppComponentCharlie. There are also multiple application-specific child objects contained within the parent object, identified below as MachineSpecAppComponentDelta and MachineSpecAppComponentEcho. The inheritance structure of Machine and the various CrossAppComponents and SpecAppComponents are described in FIG. 3.

In MachineSpecAppComponentDelta::makeConnections
  void makeConnections( ) calls the makeConnections function it inherited from MachineComponentBase, as in MachineCrossAppComponentAlpha::makeConnections.
    MachineComponentBase::makeConnections( );
  void makeConnections then establishes connections with other MachineComponents, again using pointers to objects and the names of SIGNALS and SLOTS within those objects.
    connect(parentMachine→m_MCACB, SIGNAL(bravoSignalXChanged(int)), this, SLOT(processBravoSignalXChanged(int)));
    connect(this, SIGNAL(deltaSignalYChanged (double)), parentMachine→m_MCACB, SLOT(doSomeTaskY(double)));
    connect(this, SIGNAL(deltaSignalYChanged (double)), parentMachine→m_MCACC, SLOT(doSomeTaskZ(double)));

By isolating the triggers for functional behavior in the makeConnections( ) functions of each object, a single switch statement can activate or deactivate large sets of connections, and thus, application-specific modules (e.g., first compartment code module 115 and second compartment code module 117) of cross-application program can coexist in a single concurrent program, but can be made entirely dormant or active using a single setting stored in non-volatile memory.

If necessary, it is also possible for the makeConnections( ) functions of Specific-Application Machine Components to disconnect connections made elsewhere, and/or redirect them.

Example 2: Garbage Truck Application

One example of the operation of the system 100 may include the software being applied to control a garbage truck (e.g., the vehicle 101). For example, a segment of code is written to control the Functions of this application, such as functions and settings to control the arm of the truck and the movement of a rear door. This segment of code may be included in the second compartment code module 117. The Machine Type switch statement is expanded to include the new case, Garbage truck. When the Garbage Truck machine type is selected (e.g., at a user interface in the cab 102 of the garbage truck 101), the overall functions list is expanded to include the arm controls and door controls, while still having normal access to the drive controls and cab controls, which are not specific to the Garbage Truck application. In this case, an operator using the software product in operable communication with a controller can operate the drive controls and cab controls as well as simultaneously upload and operate an arm physically connected to the truck and operably connected to the controller and an actuator, such arm movable in the up and down direction and optionally movable in the lateral direction, to grasp a trash can and position the trash can in a grasped mode above an inlet within the vehicle to dump trash in a waste bin of a vehicle.

Figure 4:
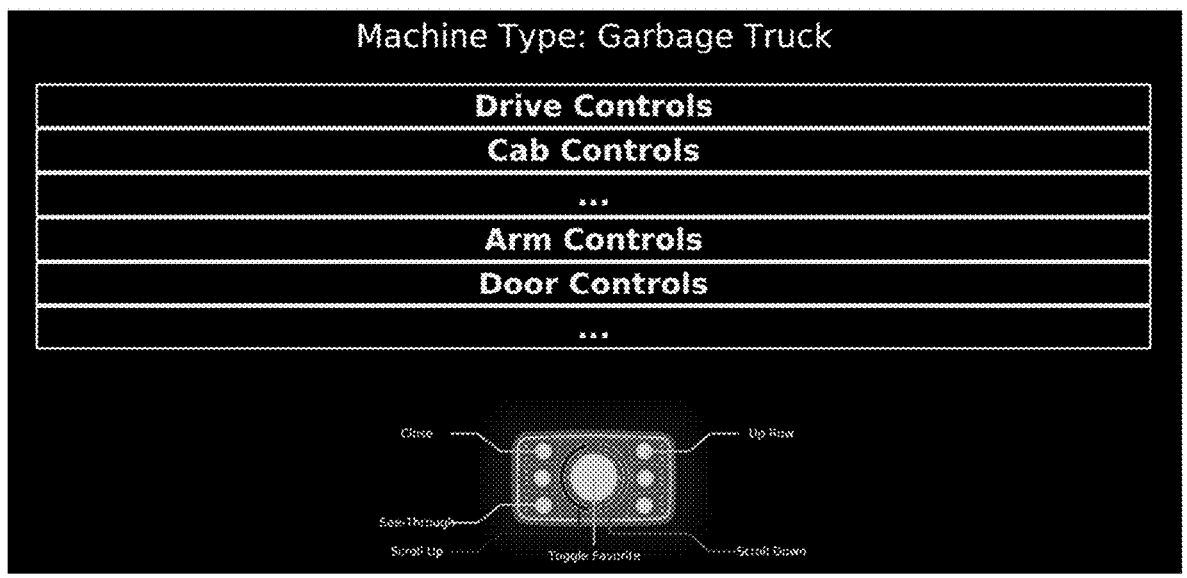
FIG. 4 is a display of the software in the cab of a vehicle operably connected to a controller with the addition of the Garbage Truck group of new functions.

For example, the operator may select a command to operate the arm of the garbage truck 101 at a user interface within the cab 102 of the garbage truck 101. An example of the user interface is provided in FIG. 4. A signal may be sent from the user interface to first compartment code module 115 via the controller 124. For example, the first compartment control module 115 may include code configured to operate the user interface. The controller 124 may determine that the command received as the user interface is for an operation that is not controlled by code within the first compartment code module 115. The controller 124 may further determine that the command received at the user interface is for an operation that is controlled by code within the second compartment code module 117. The controller 124 may generated a switch statement to transfer the command request from the first compartment code module 115 to the second compartment code module 117. Via the switch statement, the first compartment code module 115 may directly send the command request to the second compartment code module 117 without activating an interface between the first compartment code module 115 and the cross-application code 116. The second compartment code module 117 may receive the command request directly from the first compartment code module 115 without need for the cross-application code 116. The second compartment code module 117 may then execute code, based on the command request, to initiate and complete the requested command that was initially received via the user interface.

Accordingly, this garbage-truck specific activity executed by a compartment code (e.g., the second compartment code in the second compartment code module 117) can be performed through electronic communication between the cab control function specific code (e.g., the first compartment code in the first compartment code module 115) and the garbage truck specific code.

Example 3: Cement Mixer Application

Another example of the operation of the system 100 may include the software being applied to control a Cement Mixer (e.g., the vehicle 101). For example, a computer program product within a controller comprises a cross-application code 116 with at least two compartment codes (e.g., the first compartment code module 115 and the second compartment code module 117) interfacing the cross-application code 116, a first compartment code in the first compartment code module 115 controlling the operation or steering of the cement mixer and a second compartment code controlling the operation of cab functions such as dash lighting, transmission modification an air condition control. A third compartment code in a second compartment code module 117 may include code to control the functions of cement mixing in this application, such as functions and settings to control the drum of the truck and the rear chute. The Machine Type switch statement is expanded to include the new case, Cement Mixer. When the Cement Mixer machine type is selected, the overall functions list is expanded to include the drum controls and chute controls, while still having normal access to the drive controls and cab controls, which are not specific to the Cement Mixer application. The Garbage Truck code segment and all other machine type code segments still exist within the program, but the Garbage Truck functions are not available while the machine type is set to Cement Mixer.

Figure 5:
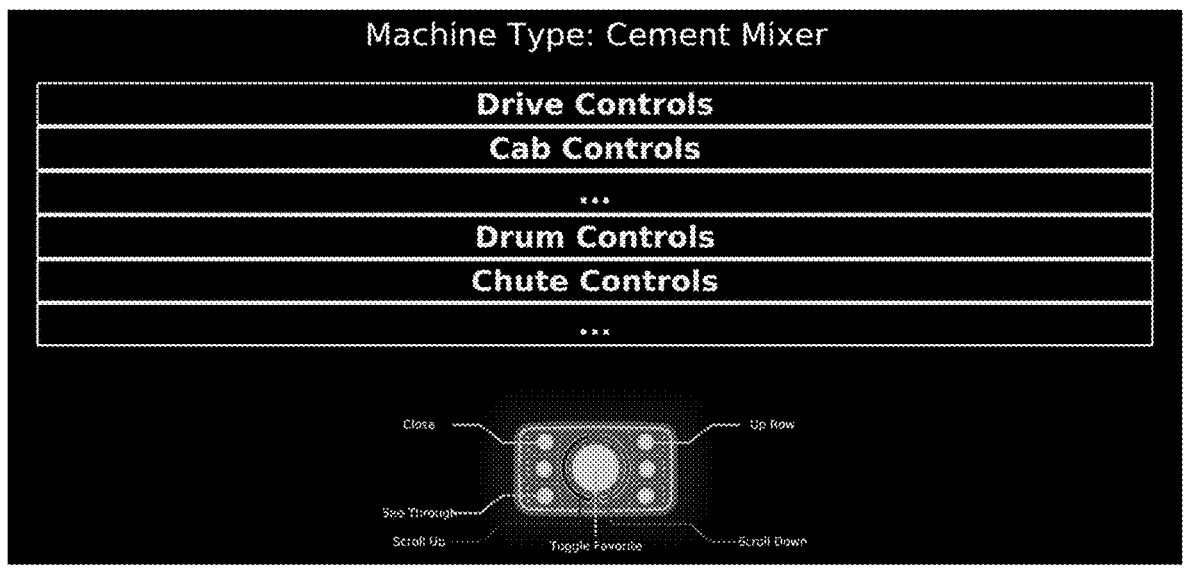
FIG. 5 is a display of the software in the cab of a vehicle operably connected to a controller with the addition of the Cement Mixer group of new functions.

For example, the operator may select a command to operate the drum controls or chute controls of the cement truck 101 at a user interface within the cab 102 of the cement truck 101. An example of the user interface for the cement truck 101 is provided in FIG. 5. A signal may be sent from the user interface to first compartment code module 115 via the controller 124. For example, the first compartment control module 115 may include code configured to operate the user interface. The controller 124 may determine that the command received as the user interface is for an operation that is not controlled by code within the first compartment code module 115. The controller 124 may further determine that the command received at the user interface is for an operation that is controlled by code within the second compartment code module 117 (e.g., "drum controls" or "chute controls"). The controller 124 may generated a switch statement to transfer the command request from the first compartment code module 115 to the second compartment code module 117. Via the switch statement, the first compartment code module 115 may directly send the command request to the second compartment code module 117 without activating an interface between the first compartment code module 115 and the cross-application code 116. The second compartment code module 117 may receive the command request directly from the first compartment code module 115 without need for the cross-application code 116. The second compartment code module 117 may then execute code, based on the command request, to initiate and complete the requested command that was initially received via the user interface.

Example 4: Excavator Application

Another example of the operation of the system 100 may include a segment of code that is written to control the functions of another application, such as functions and settings to control the arm, boom, and bucket of an excavator machine (e.g., the vehicle 100). The process may include adding a second, or, as the case may be, a third or fourth compartment code (e.g., second, third, and/or fourth compartment code modules) associated with third or fourth application-specific functions of the excavator 101 to the non-transitory computer program product. In this example, the Machine Type switch statement is expanded to include the new case, Excavator. For example, the expansion of the Machine Type switch statement may build off of the pre-existing compartment codes assigned to Cement Mixer and Garbage Truck.

When the Excavator machine type is selected, the overall functions list is expanded to include the arm, boom and bucket controls, while still having normal access to the cab controls, which are not specific to the Excavator application. The other Machine Type code segments still exist within the program, but only the Excavator and cross-application functions are available while the machine type is set to Excavator.

Figure 6:
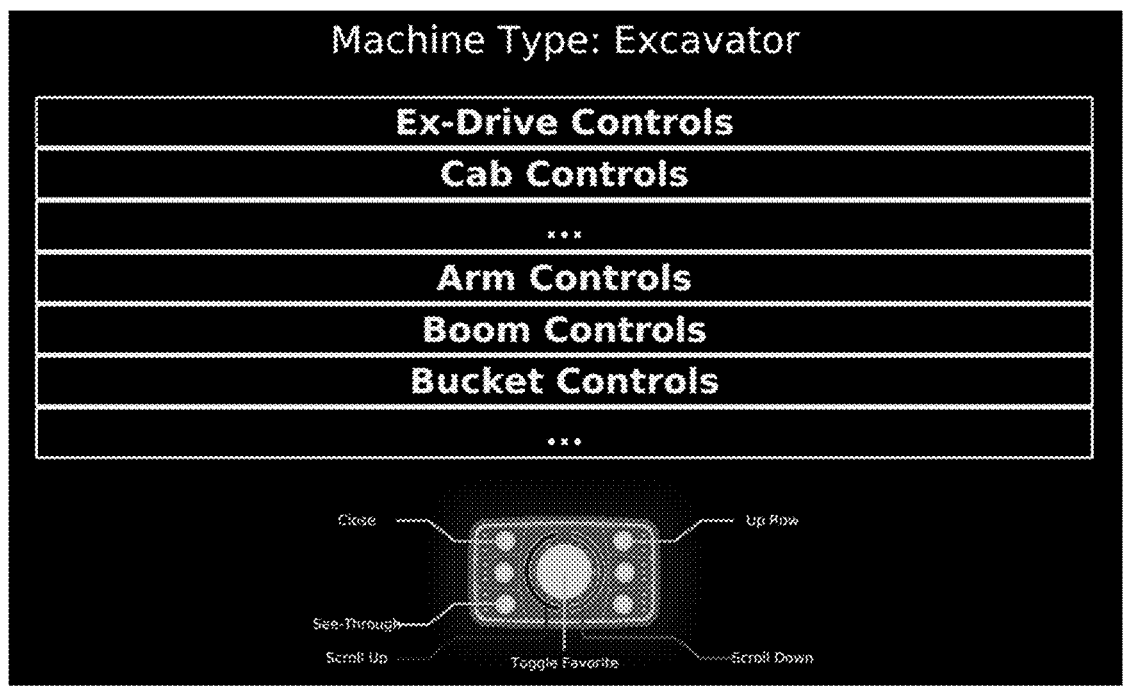
FIG. 6 is a display of the software in the cab of a vehicle operably connected to a controller with the addition of the Excavator group of new functions.

For example, the operator may select a command to operate the arm controls of the excavator 101 at a user interface within the cab 102 of the excavator 101. An example of the user interface for the excavator 101 is provided in FIG. 6. A signal may be sent from the user interface to the first compartment code module 115 via the controller 124. For example, the first compartment control module 115 may include code configured to operate the user interface. The controller 124 may determine that the command received as the user interface is for an operation that is not controlled by code within the first compartment code module 115. The controller 124 may further determine that the command received at the user interface is for an operation that is controlled by code within the second compartment code module 117 (e.g., "arm controls" "boom controls" or "bucket controls"). The controller 124 may generated a switch statement to transfer the command request from the first compartment code module 115 to the second compartment code module 117. Via the switch statement, the first compartment code module 115 may directly send the command request to the second compartment code module 117 without activating an interface between the first compartment code module 115 and the cross-application code 116. The second compartment code module 117 may receive the command request directly from the first compartment code module 115 without need for the cross-application code 116. The second compartment code module 117 may then execute code, based on the command request, to initiate and complete the requested command that was initially received via the user interface.

The cross-application Drive Controls may also be modified to account for the unique driving needs of the Excavator application, with some functions being overridden by the Excavator code segment.

Example 5: Road Paver

In another example, the operation of the system 100 may include the software being applied to control a Road Paver (e.g., the vehicle 101). A segment of code is written to control the Functions of this application, such as functions and settings to control the elevation, steering, and speed of the road paver 101. The Machine Type switch statement is expanded to include the new case, Road Paver. When the Excavator machine type is selected, the overall function list is expanded to include the elevation, steering and speed controls, while still having normal access to the cab controls, which are not specific to the Road Paver application. The other Machine Type code segments still exist within the program, but only the Road Paver and cross-application functions are available while the machine type is set to Road Paver.

Figure 7:
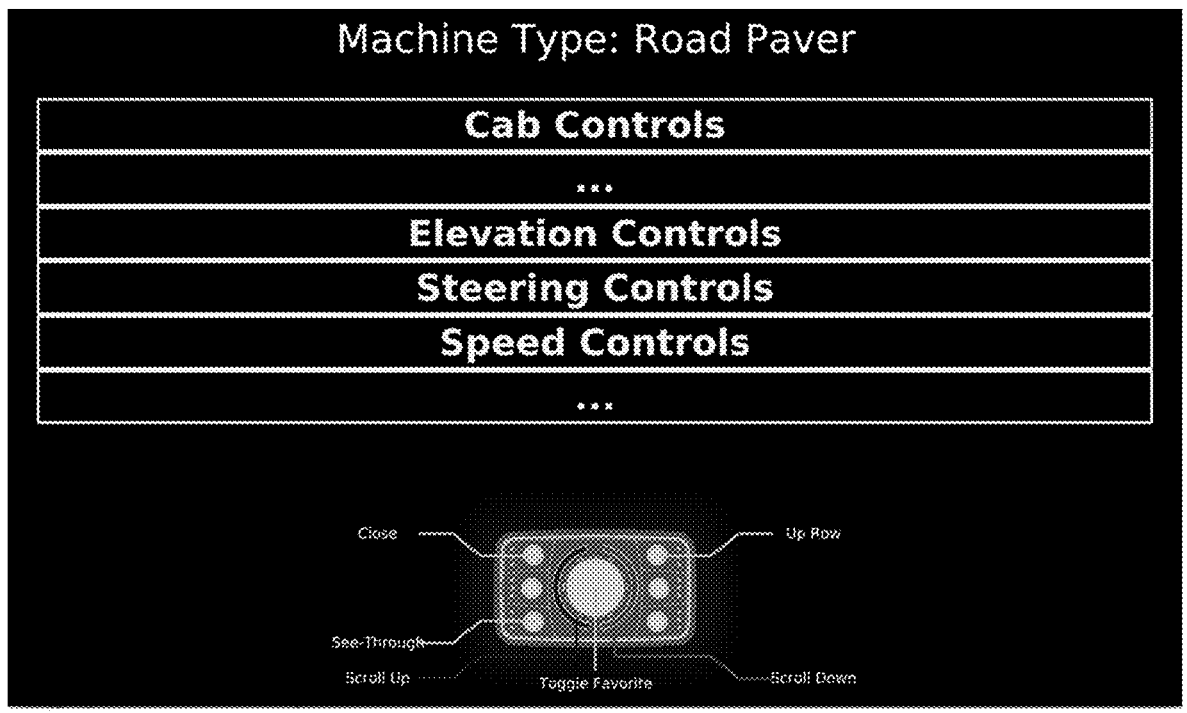
FIG. 7 is a display of the software in the cab of a vehicle operably connected to a controller with the addition of the Road Paver group of new functions.

For example, the operator may select a command to operate the elevation controls of the road paver 101 at a user interface within the cab 102 of the road paver 101. An example of the user interface for the road paver 101 is provided in FIG. 7. A signal may be sent from the user interface to the first compartment code module 115 via the controller 124. For example, the first compartment control module 115 may include code configured to operate the user interface. The controller 124 may determine that the command received as the user interface is for an operation that is not controlled by code within the first compartment code module 115. The controller 124 may further determine that the command received at the user interface is for an operation that is controlled by code within the second compartment code module 117 (e.g., "elevation controls" "steering controls" or "speed controls"). The controller 124 may generated a switch statement to transfer the command request from the first compartment code module 115 to the second compartment code module 117. Via the switch statement, the first compartment code module 115 may directly send the command request to the second compartment code module 117 without activating an interface between the first compartment code module 115 and the cross-application code 116. The second compartment code module 117 may receive the command request directly from the first compartment code module 115 without need for the cross-application code 116. The second compartment code module 117 may then execute code, based on the command request, to initiate and complete the requested command that was initially received via the user interface.

The cross-application Drive Controls are also completely disabled by the Road Paver code segment, due to the completely different locomotion needs of the Road Paver.

While the methods and systems have been described in connection with example embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A computer-implemented method of adding a compartment function within a non-transitory computer program product within a controller, such computer program product comprising the cross-application code, a switch statement, and a first compartment code, the method comprising:
(i) adding a second compartment code associated with second application-specific function to the non-transitory computer program product;
(ii) adding an additional case to the switch statement; and
(iii) executing the second application-specific function by activating the new case of the switch statement;
wherein the step of executing the second application-specific function is free of a step of activating an interface between the first compartment code and the cross-application code.

Aspect 2: The computer-implemented method of aspect 1, wherein the first application code comprises at least one virtual object corresponding to a first application and the second application code comprises at least one virtual object corresponding to a second application.

Aspect 3: The computer-implemented method of aspect 1 or aspect 2, wherein the first application code comprises at least one virtual object and one component corresponding to a first application and the second application code comprises at least one virtual object and one component corresponding to a second application.

Aspect 4: The computer-implemented method of any one of the preceding aspects, wherein the first application-specific function is a vehicle accessory function.

Aspect 5: The computer-implemented method of any one of the preceding aspects, wherein the first application-specific function is a construction vehicle accessory function.

Aspect 6: The computer-implemented method of any one of the preceding aspects, wherein step (iii) further comprises executing the first application-specific function with the activation of the switch command derived from the second compartment.

Aspect 7: The computer-implemented method of any one of aspects 2 through 6, wherein step (iii) further comprises executing the first application-specific function with the activation of the switch command derived from the second compartment by establishing one or a plurality of interfaces between the at least one object corresponding to the first application and the at least one object corresponding to the second application.

Aspect 8: The computer-implemented method of any one of the preceding aspects, wherein, before step (i), the cross-application code and the first component code establish one or a plurality of interfaces for activation of a first application-specific function.

Aspect 9: A non-transitory computer program product encoded on a computer-readable storage medium comprising instructions, in a system comprising a cross-application code and one or a plurality of compartments, each compartment comprising a virtual object and an application-specific function code associated with at least a first application-specific command, for:
(i) receiving an additional compartment code associated with a second application-specific function, wherein the second compartment code may be enabled (i.e. cross-application and application-specific events within the computer program are made to trigger the second application-specific function) via a single command;
(ii) executing the second application-specific function by issuing the enabling command;
wherein the step of executing the second application-specific function is free of a step of activating an interface between the first compartment code and the cross-application code.

Aspect 10: The non-transitory computer program product of aspect 9, further comprising a step of adding an additional case to the switch statement after step (i) and before step (ii).

Aspect 11: The non-transitory computer program product of aspect 9 or aspect 10, wherein the first application-specific code comprises at least one virtual object corresponding to a first application and the additional application code comprises at least one virtual object corresponding to a second application.

Aspect 12: The non-transitory computer program product of any one of aspect 9 through 11, wherein the first application code comprises at least one virtual object and one component corresponding to a first application and the additional application code comprises at least one virtual object and one component corresponding to an additional application.

Aspect 13: The non-transitory computer program product of any one of aspects 9 through 12, wherein the first application-specific function is a vehicle accessory function.

Aspect 14: The non-transitory computer program product of any one of aspects 9 through 13, wherein the first application-specific function is a construction vehicle accessory function.

Aspect 15: The non-transitory computer program product of any one of aspects 9 through 14, wherein step (ii) further comprises executing the first application-specific function by activation of the command issued by the first case of the switch statement from the additional compartment.

Aspect 16: The non-transitory computer program product of aspect 12, wherein step (ii) further comprises executing the first application-specific function with the activation of the new switch case by establishing one or a plurality of interfaces between the at least one object corresponding to the first application and the at least one object corresponding to the second application.

Aspect 17: The non-transitory computer program product of any of aspects 9 through 16, wherein, before step (i), the cross-application code and the first component establish one or a plurality of interfaces for activation of a first and/or plurality of application-specific functions.

Aspect 18: A vehicle comprising:
(a) a first application;
(b) a second application;
(c) an electronic circuit in operable, electronic communication with the first and second applications, the circuit comprising a controller;
(d) the non-transitory computer program product encoded on a computer-readable storage medium of any of aspects 9 through 17 in operable communication with the controller.

Aspect 19: The vehicle of aspect 18 further comprising a display in operable communication with the controller.

Aspect 20: The vehicle of aspect 19, wherein the display is capable of displaying one or more signals corresponding to one or more virtual objects from the one or plurality of compartments encoded within the non-transitory computer program product.

Aspect 21: The vehicle of any of aspects 18 through 20, wherein the vehicle is free of a combustion engine.

Aspect 22: The vehicle of any of aspects 18 through 21, wherein the vehicle is a construction vehicle comprising at least a first and a second operable condition, wherein, in the first operable condition, the vehicle has at least a first application activated; and, in the second operable condition, the vehicle has at least the second or additional application activated.

Aspect 23: The vehicle of aspect 22, wherein, in the second operable condition, the vehicle has both the first and second applications activated simultaneously.

Aspect 24: The vehicle of any of aspects 18 through 23, wherein the non-transitory computer program product is operably linked to an embedded processor.

Aspect 25: A computer-implemented method of activating an application on a system comprising a cross-application code and a first compartment comprising:
a. appending a second compartment to the system, wherein the second compartment comprises a compartment-activating command independent of the cross-application code;
b. establishing an interface between the first compartment and the second compartment by the compartment-activating command within the second compartment;
c. executing the second application-specific function by activating the new switch case and the second compartment code;
wherein step (b) is free of creating an interface between the second compartment and the cross-application code.

Aspect 26: The computer-implemented method of aspect 25, wherein the first compartment comprises at least one virtual object corresponding to a first application and the second application compartment comprises at least one virtual object corresponding to a second application.

Aspect 27: The computer-implemented method of any of aspects 25 or 26, wherein the first application compartment comprises at least one virtual object and one component corresponding to a first application and the second application compartment comprises at least one virtual object and one component corresponding to a second application.

Aspect 28: The computer-implemented method of any of aspects 25 through 27 wherein the first application-specific function is a vehicle accessory function.

Aspect 29: The computer-implemented method of any of aspects 25 through 28, wherein the first application-specific function is a construction vehicle accessory function.

Aspect 30: A computer-implemented method of executing a compartment function within a non-transitory computer program product, such computer program product comprising a cross-application code, a switch statement, a first compartment code, a second compartment code associated with a second application—specific function, the method comprising:
  (i) triggering the switch statement with a case corresponding to the second application-specific function;
  (ii) executing the second application-specific function by activating the case of the switch statement;
  wherein the step of executing the second application-specific function is free of a step of activating an interface between the first compartment code and the cross-application code; and
  wherein the second application-specific function to the non-transitory computer program product is enabled via a single command.

The invention claimed is:

1. A computer-implemented method of adding a compartment function within a non-transitory computer program product within a controller, the computer program product comprising a cross-application code, a switch statement, and a first compartment code, the computer-implemented method comprising:
  (i) adding a second compartment code associated with second application-specific function to the non-transitory computer program product;
  (ii) adding an additional case to the switch statement; and
  (iii) executing the second application-specific function by activating the additional case of the switch statement;
  wherein the step of executing the second application-specific function is free of a step of activating an interface between the first compartment code and the cross-application code, wherein step (iii) further comprises executing a first application-specific function with an activation of the switch statement derived from an additional compartment by establishing one or a plurality of interfaces between a first application and a second application.

2. The computer-implemented method of claim 1, wherein the first compartment code comprises at least one virtual object corresponding to the first application and the second compartment code comprises at least one virtual object corresponding to the second application.

3. The computer-implemented method of claim 2, wherein step (iii) further comprises executing the first application-specific function with the activation of the switch statement derived from the additional compartment by establishing one or a plurality of interfaces between the at least one virtual object corresponding to the first application and the at least one virtual object corresponding to the second application.

4. The computer-implemented method of claim 1, wherein a first application code comprises at least one virtual object and one component corresponding to the first application and a second application code comprises at least one virtual object and one component corresponding to the second application.

5. The computer-implemented method of claim 1, wherein the first application-specific function is a vehicle accessory function.

6. The computer-implemented method of claim 1, wherein the first application-specific function is a construction vehicle accessory function.

7. The computer-implemented method of claim 1, wherein, before step (i), the cross-application code and the first compartment code establish one or a plurality of interfaces for activation of the first application-specific function.

8. A non-transitory computer program product encoded on a computer-readable storage medium comprising instructions, in a system comprising a cross-application code and one or a plurality of compartments, each compartment comprising a virtual object and an application-specific function code associated with at least a first application-specific command, for:
  (i) receiving an additional compartment code associated with a second application-specific function, wherein the additonal compartment code is configured to be enabled via a single command by configuring the cross-application code and application-specific events within the computer program product to trigger the second application-specific function; and
  (ii) executing the second application-specific function by issuing the single command;
  wherein the step of executing the second application-specific function is free of a step of activating an interface between a first compartment code and the cross-application code, wherein step (ii) further comprises executing a first application-specific function by activation of a command issued by a first case of a switch statement from an additional compartment by establishing one or a plurality of interfaces between a first application and a second application.

9. The non-transitory computer program product of claim 8, further comprising a step of adding an additional case to the switch statement after step (i) and before step (ii).

10. The non-transitory computer program product of claim 8, wherein a first application-specific function code comprises at least one virtual object corresponding to the first application and the additional compartment code comprises at least one virtual object corresponding to the second application.

11. The non-transitory computer program product of claim 8, wherein a first application-specific function code comprises at least one virtual object and one component corresponding to the first application and the additional compartment code comprises at least one virtual object and one component corresponding to the second application.

12. The non-transitory computer program product of claim 8, wherein the first application-specific function is a vehicle accessory function.

13. The non-transitory computer program product of claim 8, wherein the first application-specific function is a construction vehicle accessory function.

14. The non-transitory computer program product of claim 8, wherein step (ii) further comprises executing the first application-specific function with the activation of an additional case of the switch statement by establishing one or a plurality of interfaces between the at least one virtual object corresponding to the first application and at least one virtual object corresponding to the second application.

15. The non-transitory computer program product of claim 8, wherein, before step (i), the cross-application code and the first compartment code establish one or a plurality of interfaces for activation of a first plurality of application-specific functions.

16. A vehicle comprising:
(a) a first application;
(b) a second application;
(c) an electronic circuit in operable, electronic communication with the first application and the second application, the electronic circuit comprising a controller; and
(d) a non-transitory computer program product encoded on a computer-readable storage medium, the non-transitory computer program product comprising instructions, in a system comprising a cross-application code and one or a plurality of compartments, each compartment comprising a virtual object and an application-specific function code associated with at least a first application-specific command, for:
 (i) receiving an additional compartment code associated with a second application-specific function, wherein the additional compartment code is configured to be enabled via a single command by configuring the cross-application code and application-specific events within the computer program product to trigger the second application-specific function; and
 (ii) executing the second application-specific function by issuing the single command;
wherein the step of executing the second application-specific function is free of a step of activating an interface between a first compartment code and the cross-application code, wherein step (ii) further comprises executing a first application-specific function by activation of a command issued by a first case of a switch statement from an additional compartment by establishing one or a plurality of interfaces between the first application and the second application.

17. The vehicle of claim 16, further comprising a display in operable communication with the controller.

* * * * *